United States Patent
Kim et al.

(10) Patent No.: US 12,257,931 B2
(45) Date of Patent: Mar. 25, 2025

(54) SEAT RAIL LOCKING DEVICE FOR VEHICLE

(71) Applicant: Hyundai Transys Inc., Seosan-si (KR)

(72) Inventors: Cheon Kim, Hwaseong-si (KR); Kyeong Ho Seo, Suwon-si (KR); Heoung Su Lim, Hwaseong-si (KR); Seong Jun Hwang, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/465,873

(22) Filed: Sep. 12, 2023

(65) Prior Publication Data

US 2024/0109461 A1   Apr. 4, 2024

(51) Int. Cl.
*B60N 2/00* (2006.01)
*B60N 2/08* (2006.01)

(52) U.S. Cl.
CPC ......... *B60N 2/0806* (2013.01); *B60N 2/0818* (2013.01)

(58) Field of Classification Search
None
See application file for complete search history.

(56) References Cited

U.S. PATENT DOCUMENTS

| | | | | |
|---|---|---|---|---|
| 2019/0283630 A1* | 9/2019 | Tamaki | | B60N 2/0887 |
| 2020/0238859 A1* | 7/2020 | Taniguchi | | B60N 2/0818 |
| 2020/0238861 A1* | 7/2020 | Taniguchi | | B60N 2/0705 |
| 2021/0245633 A1* | 8/2021 | Poptani | | B60N 2/0818 |
| 2022/0063451 A1* | 3/2022 | Hwang | | B60N 2/073 |
| 2022/0266726 A1* | 8/2022 | Taniguchi | | B60N 2/085 |
| 2023/0256871 A1* | 8/2023 | Kuroda | | B60N 2/0818 248/430 |
| 2024/0100999 A1* | 3/2024 | Kuroda | | B60N 2/0818 |

FOREIGN PATENT DOCUMENTS

| | | | |
|---|---|---|---|
| DE | 3042379 A1 | 6/1982 | |
| DE | 10041605 C1 | 1/2002 | |
| DE | 102008056683 A1 | 5/2010 | |
| FR | 2759330 A1 | 8/1998 | |
| FR | 2901193 A1 * | 11/2007 | ........... B60N 2/0705 |
| KR | 10-2021-0067580 A | 6/2021 | |
| WO | WO-2016091614 A1 * | 6/2016 | ........... B60N 2/0705 |

OTHER PUBLICATIONS

Daniel Klinteback, "Extended European Search Report for EP Application No. 23197395.9", Feb. 20, 2024, EPO, Germany.

* cited by examiner

*Primary Examiner* — Steven M Marsh
(74) *Attorney, Agent, or Firm* — Bridgeway IP Law Group, PLLC; Jihun Kim

(57) ABSTRACT

A seat rail locking device for a vehicle includes a lower rail having a plurality of locking grooves formed in an inner flange and opened downward, a locking plate having a plurality of locking teeth configured to be inserted into or withdrawn from the plurality of locking grooves when the locking plate moves upward or downward, an upper rail inserted into the lower rail so as to be slidable straight and having a locking-lifting mechanism configured to switch a locking state by moving the locking plate upward or downward, and an anti-rotation mechanism configured to suppress a rotation of the locking plate against a transverse load applied to the upper rail.

13 Claims, 11 Drawing Sheets

SEAT RAIL LOCKING DEVICE FOR VEHICLE

CROSS REFERENCE TO RELATED APPLICATION

The present application claims priority to Korean Patent Application No. 10-2022-0124400, filed on Sep. 29, 2022, the entire contents of which are incorporated herein for all purposes by this reference.

BACKGROUND OF THE INVENTION

Field of the Invention

The present invention relates to a technology related to a locking device capable of changing and fixing a seat position in a vehicle.

Description of the Related Art

A vehicle is equipped with seats for occupants. Some of these seats are configured to be moved and fixed in position in a forward/rearward direction in accordance with the occupant's needs.

In order to move the seat in the forward/rearward direction relative to a vehicle body and fix the seat, a seat rail may be provided between the seat and a floor of the vehicle body, the seat may be configured to move in the forward/rearward direction along the seat rail, and the position of the seat, which has moved, may be fixed or released by a locking device.

Specifically, a lower rail is mounted on the floor of the vehicle body, and the seat is coupled to an upper rail configured to slide straight in the forward/rearward direction relative to the lower rail. The locking device is configured to allow or suppress a change in relative position of the upper rail with respect to the lower rail.

Meanwhile, in the related art, a seat belt, which has been fixed to the vehicle body, is fixed to the seat. Recently, the ability to support a load, which needs to be applied to the seat, has further increased, and thus the stability of the locking device, which maintains a locking state, needs to be further improved.

The foregoing explained as the background of the invention is intended merely to aid in the understanding of the background of the present invention, and is not intended to mean that the present invention falls within the purview of the related art that is already known to those skilled in the art.

SUMMARY OF THE INVENTION

The present invention is proposed to solve these problems and aims to provide a seat rail locking device for a vehicle, which is capable of further improving stability of a seat by more stably maintaining a locking state by preventing the locking state of the seat rail locking device from being released even though an impact load is applied to the seat.

To achieve the above-mentioned object, the present invention provides a seat rail locking device for a vehicle, the seat rail locking device including: a lower rail having a plurality of locking grooves formed in an inner flange and opened downward; a locking plate having a plurality of locking teeth configured to be inserted into or withdrawn from the plurality of locking grooves when the locking plate moves upward or downward; an upper rail inserted into the lower rail so as to be slidable straight and having a locking-lifting mechanism configured to switch a locking state by moving the locking plate upward or downward; and an anti-rotation mechanism configured to suppress a rotation of the locking plate against a transverse load applied to the upper rail.

The anti-rotation mechanism may be configured by a plurality of catching protrusions provided on the locking teeth of the locking plate.

The locking plate may include: a central portion connected to the upper rail; and a plurality of locking teeth protruding from two opposite sides of the central portion, and the catching protrusions may be provided at ends of the locking teeth.

The central portion of the locking plate may be elongated in a longitudinal direction of the lower rail, the plurality of locking teeth may protrude in a direction perpendicular to the longitudinal direction of the lower rail and be disposed in the longitudinal direction of the central portion at predetermined intervals, and the catching protrusion may protrude locally from the end of each of the locking teeth in the longitudinal direction of the lower rail.

Based on the central portion of the locking plate, the catching protrusions at one side may protrude forward from the locking teeth, and the catching protrusions at the other side may protrude rearward from the locking teeth.

When a direction of a seat installed to be close to one side based on a centerline of a vehicle body is defined as a first reference direction, the catching protrusions may protrude forward from the locking teeth, which protrude in the first reference direction, based on the central portion of the locking plate, and the catching protrusions may protrude rearward from the locking teeth, which protrude in a direction opposite to the first reference direction, based on the central portion of the locking plate.

Among the plurality of locking teeth protruding in the first reference direction of the locking plate, only the locking teeth at the front side may have the catching protrusions, and the locking teeth at the rear side may not have the catching protrusions, and among the plurality of locking teeth protruding in the direction opposite to the first reference direction of the locking plate, only the locking teeth at the rear side may have the catching protrusions, and the locking teeth at the front side may not have the catching protrusions.

When a transverse direction of a vehicle body connected to a safety belt installed to connect the vehicle body and a seat is defined as a second reference direction, the catching protrusions may protrude forward from the locking teeth, which protrude in the second reference direction, based on the central portion of the locking plate, and the catching protrusions may protrude rearward from the locking teeth, which protrude in the direction opposite to the second reference direction, based on the central portion of the locking plate.

Among the plurality of locking teeth protruding in the second reference direction of the locking plate, only the locking teeth at the front side may have the catching protrusions, and the locking teeth at the rear side may not have the catching protrusions, and among the plurality of locking teeth protruding in the direction opposite to the second reference direction of the locking plate, only the locking teeth at the rear side may have the catching protrusions, and the locking teeth at the front side may not have the catching protrusions.

The locking-lifting mechanism may include: a guide bracket fixed to the upper rail and having a guide pin configured to guide upward and downward movements of the locking plate; a spring configured to elastically support the locking plate upward with respect to the guide bracket and allow the locking plate to be coupled to the locking grooves of the lower rail; and a center pin configured to allow the locking plate to be withdrawn from the locking grooves by moving downward while overcoming an elastic force of the spring by means of a straight displacement provided from the outside.

In addition, to achieve the above-mentioned object, the present invention provides a seat rail locking device for a vehicle, the seat rail locking device including: a lower rail having a plurality of locking grooves; an upper rail inserted into the lower rail so as to be slidable straight; a locking plate installed to be inserted into or withdrawn from locking grooves of the lower rail by moving upward or downward relative to the upper rail; a spring configured to elastically support the locking plate upward and allow locking teeth of the locking plate to be inserted into the locking grooves of the lower rail; and a center pin configured to implement a state in which the locking teeth are withdrawn from the locking grooves by moving the locking plate downward while overcoming an elastic force of the spring by means of a straight displacement provided from the outside, in which catching protrusions are provided on the locking teeth of the locking plate and prevent a rotation and withdrawal of the locking plate relative to the lower rail.

The locking plate may include a central portion provided at a center thereof and elongated in a longitudinal direction of the upper rail, and the plurality of locking teeth may protrude from two opposite sides of the central portion so as to be correspondingly inserted into the locking grooves of the lower rail.

In the locking plate, the catching protrusions may protrude forward from the plurality of locking teeth, which is positioned at the front side of one side, based on the central portion, and the catching protrusions may protrude rearward from the plurality of locking teeth, which is positioned at the rear side of the other side, based on the central portion.

The catching protrusions may protrude from ends of the locking teeth in a longitudinal direction of the central portion.

In addition, to achieve the above-mentioned object, the present invention provides a seat rail locking device for a vehicle, the seat rail locking device including: a central portion having a flat plate shape and elongated straight; a plurality of locking teeth protruding from two opposite sides of the central portion in a direction perpendicular to a longitudinal direction of the central portion and disposed at predetermined intervals; and catching protrusions protruding from ends of the locking teeth in the longitudinal direction of the central portion.

The catching protrusions may protrude forward from the plurality of locking teeth, which is positioned at the front side of one side, based on the central portion, and the catching protrusions may protrude rearward from the plurality of locking teeth, which is positioned at the rear side of the other side, based on the central portion.

The present invention may further improve stability of the seat by more stably maintaining the locking state by preventing the locking state of the seat rail locking device from being released even though an impact load is applied to the seat.

In addition, there is no component protruding downward from the lower rail of the seat rail locking device, which makes it possible to ensure the ease of installation of the lower rail and ensure the utilization of the space below the lower rail.

DETAILED DESCRIPTION OF THE INVENTION

Figure 1:
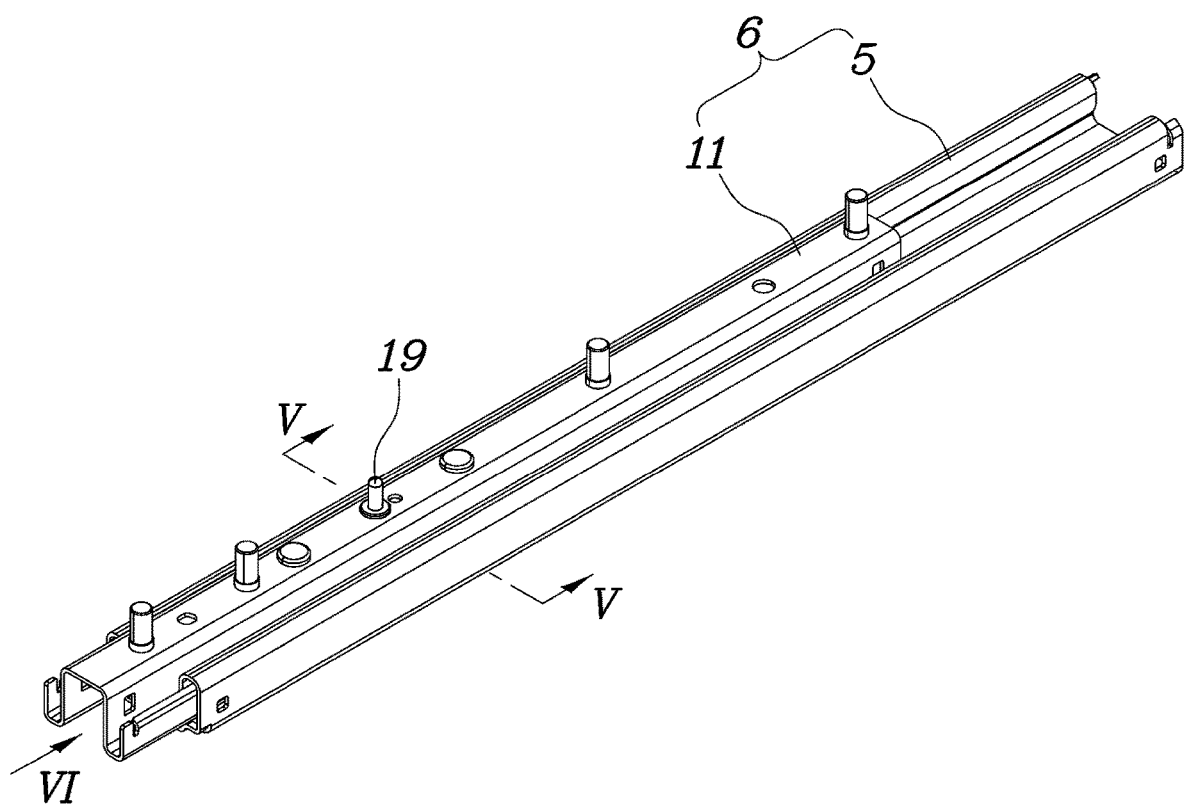
FIG. 1 is a view illustrating a seat rail of a vehicle according to the present invention.
Figure 2:
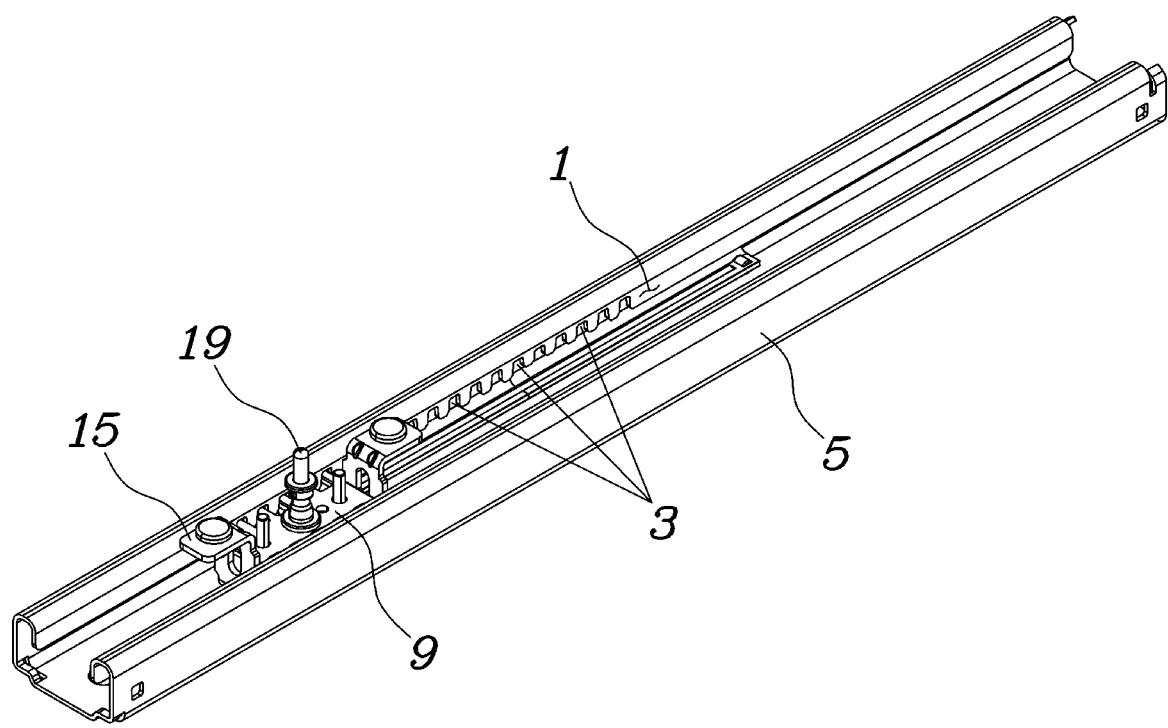
FIG. 2 is a view illustrating a state in which an upper rail in FIG. 1 is excluded.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood that the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

With reference to FIGS. 1 to 8, an embodiment of a seat rail locking device for a vehicle of the present invention includes a lower rail 5 having a plurality of locking grooves 3 formed in an inner flange 1 and opened downward; a locking plate 9 having a plurality of locking teeth 7 configured to be inserted into or withdrawn from the plurality of locking grooves 3 when the locking plate 9 moves upward or downward; an upper rail 11 inserted into the lower rail 5 so as to be slidable straight and having a locking-lifting mechanism configured to switch a locking state by moving the locking plate 9 upward or downward; and an anti-rotation mechanism configured to suppress a rotation of the locking plate 9 against a transverse load applied to the upper rail 11.

That is, in the present invention, the rotation of the locking plate 9 is suppressed by the anti-rotation mechanism when a force for rotating the upper rail 11 and the locking plate 9 relative to the lower rail 5 is applied by the transverse load applied to the upper rail 11. Therefore, the locking plate 9 may not be withdrawn from the locking grooves 3 of the lower rail 5, such that the locking state of the seat rail may be stably maintained without being released, thereby significantly improving the stability of the seat.

For reference, in this case, the seat rail 6 includes the lower rail 5 and the upper rail 11. The lower rail 5 is mainly fixed to a floor of a vehicle body. The upper rail 11 is connected to a seat. When the upper rail 11 slides straight relative to the lower rail 5, the seat may move in a forward/rearward direction relative to the vehicle body. When the locking-lifting mechanism moves the locking plate 9 upward, the locking teeth 7 are inserted into the locking grooves 3 of the lower rail 5, such that the locking state of the seat rail is implemented. When the locking-lifting mechanism moves the locking plate 9 downward, the locking teeth 7 are withdrawn from the locking grooves 3, such that the locking state of the seat rail 6 is released.

In the present embodiment, the locking-lifting mechanism includes a guide bracket 15 fixed to the upper rail 11 and having a guide pin 13 for guiding the upward and downward movements of the locking plate 9, springs 17 configured to elastically support the locking plate 9 upward with respect to the guide bracket to allow the locking plate 9 to be coupled to the locking grooves 3 of the lower rail 5, and a center pin 19 configured to allow the locking plate 9 to be withdrawn from the locking grooves 3 by moving downward while overcoming elastic forces of the springs 17 by means of a straight displacement provided from the outside.

In this case, the center pin 19 is configured to receive a straight displacement from an operating lever separately provided on the seat.

Therefore, when a user manipulates the operating lever, a straight displacement for moving the center pin 19 downward is generated and pushes the center pin 19 downward. Therefore, when the locking plate 9 moves downward, the locking teeth 7 of the locking plate 9 are withdrawn from the locking grooves 3 of the lower rail 5, such that the upper rail 11 may freely slide in the forward/rearward direction relative to the lower rail 5.

In addition, when the user releases the operating lever, the locking plate 9 is moved upward by the elastic forces of the springs 17, such that the locking teeth 7 are inserted into the locking grooves 3 of the lower rail and restrict the straight sliding motion of the upper rail 11 relative to the lower rail 5.

Figure 3:
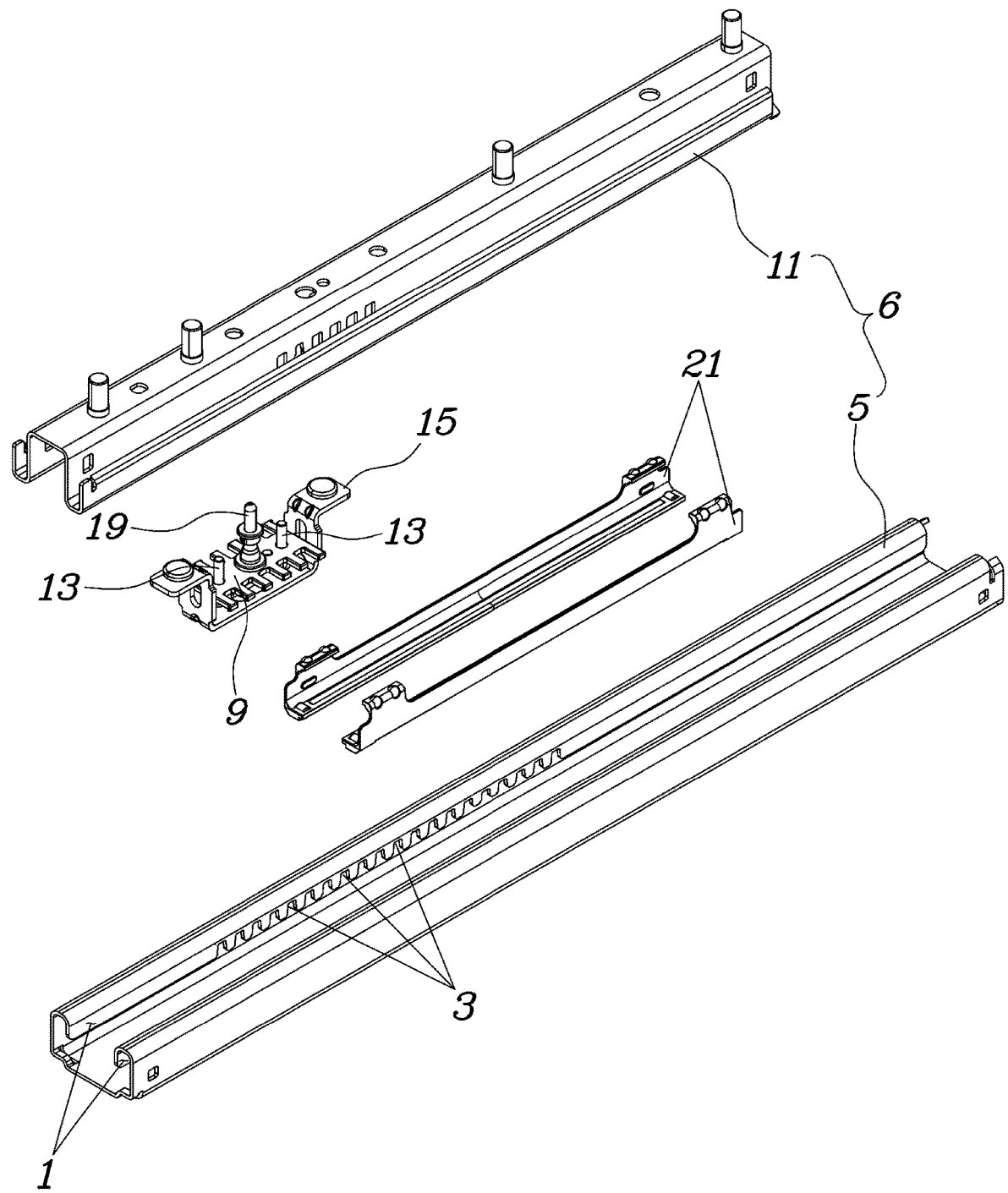
FIG. 3 is an exploded view of the seat rail in FIG. 1.
Figure 4:
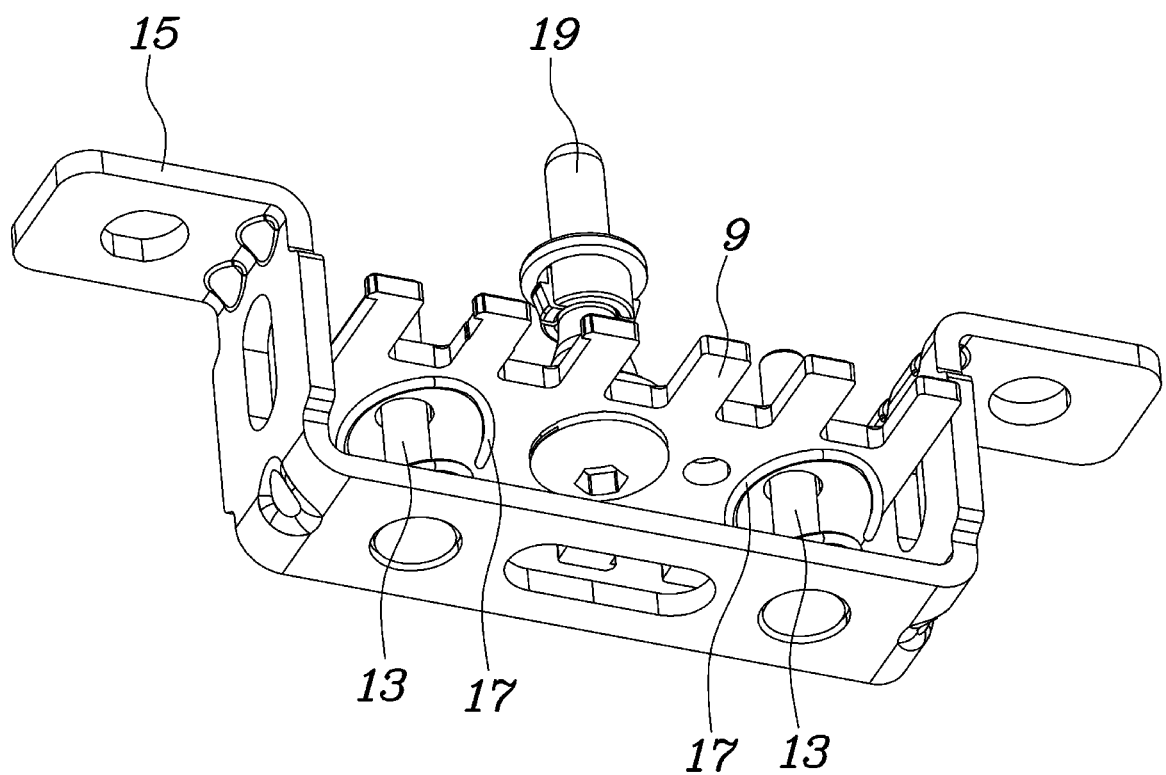
FIG. 4 is a view illustrating in detail a locking-lifting mechanism and a locking plate in FIG. 3 when viewed at another angle.
Figure 5:
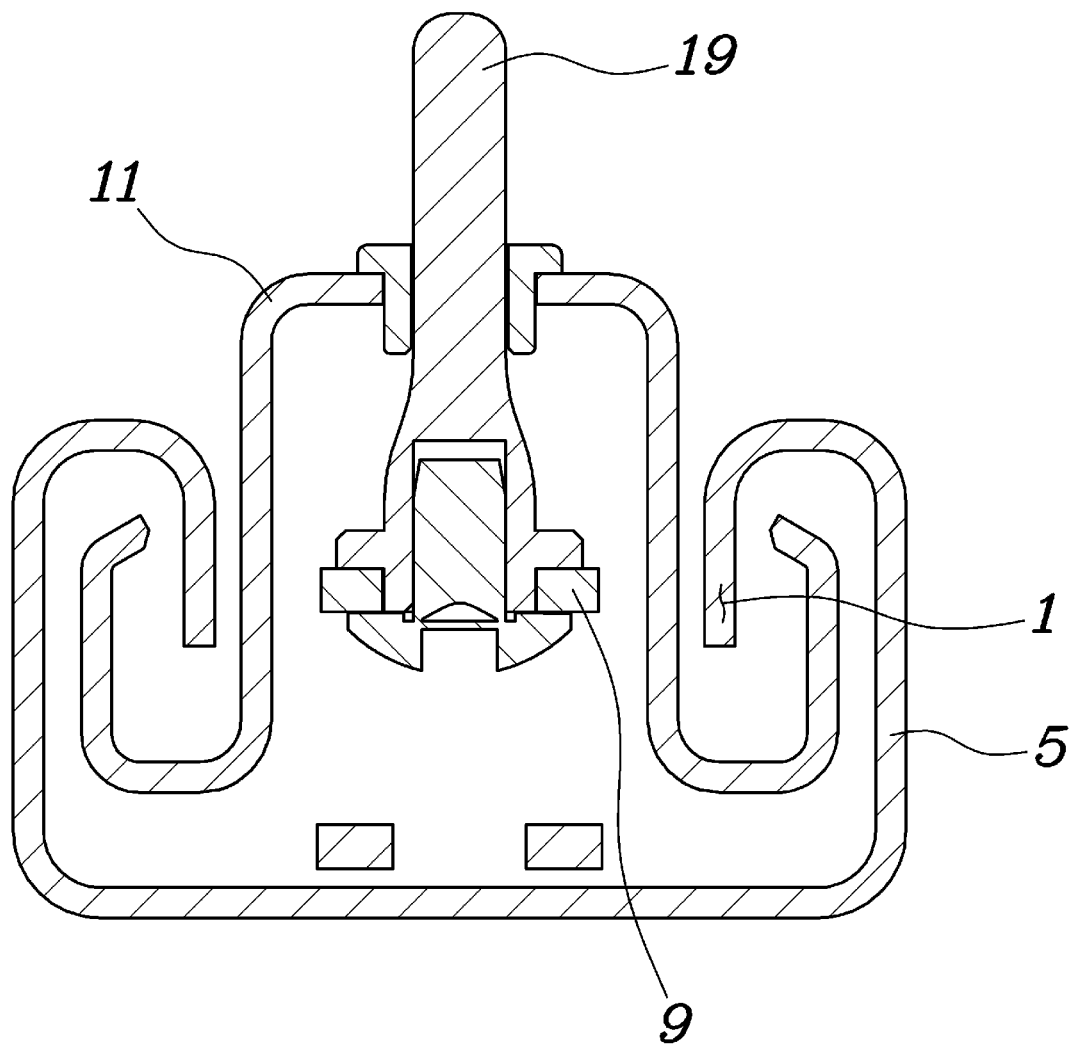
FIG. 5 is a cross-sectional view taken along line V-V in FIG. 1.
Figure 6:
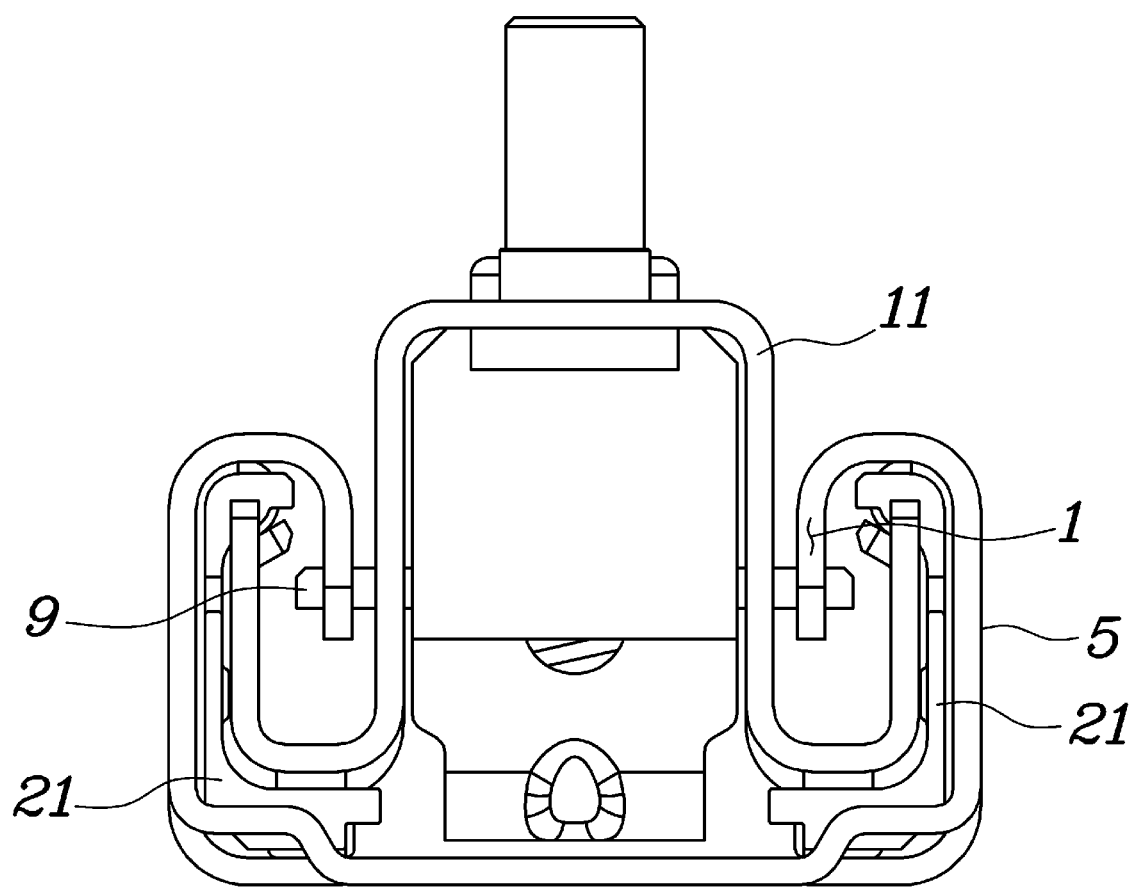
FIG. 6 is an observation view in direction VI in FIG. 1.
Figure 7:
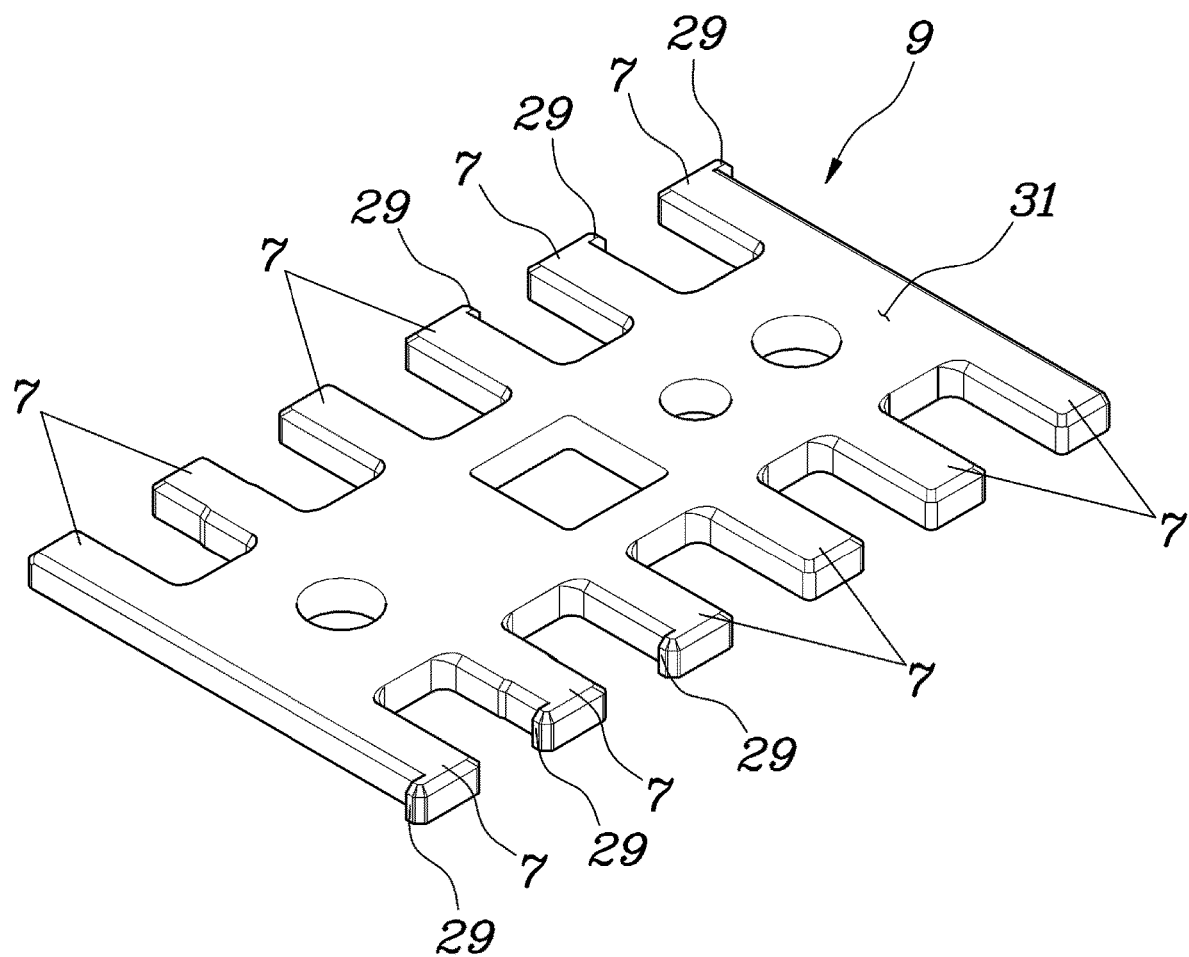
FIG. 7 is a perspective view illustrating the locking plate of the present invention.

For reference, FIG. 3 also illustrates retainers 21 configured to softly guide the straight sliding motion of the upper rail 11 relative to the lower rail 5.

In addition, the seat rail 6 in FIG. 1 is any one of the pair of seat rails 6 installed below the seat.

Figure 9:
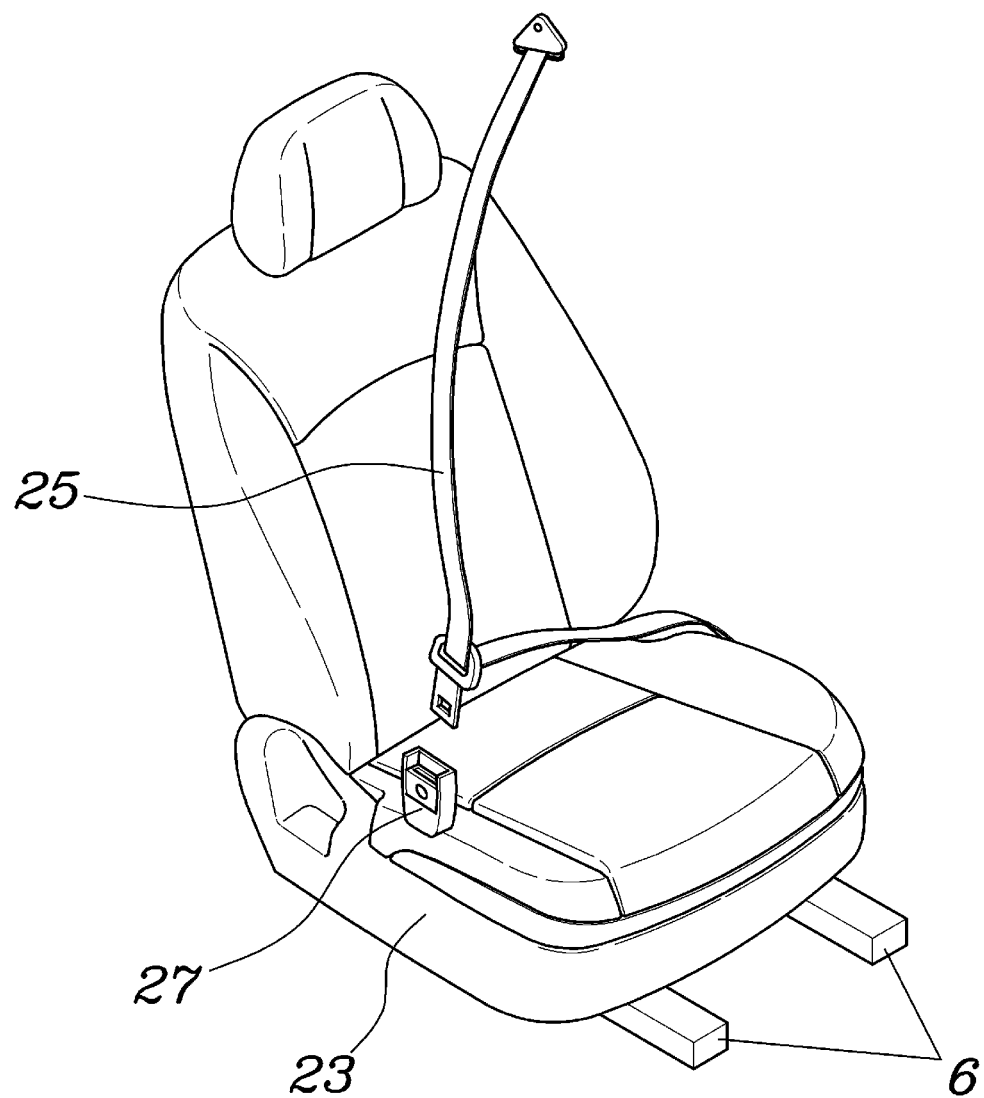
FIG. 9 is a view for explaining a state in which a seat belt is installed on a seat of the vehicle.

Meanwhile, as illustrated in FIG. 9, a buckle 27 coupled to a seat belt 25 is connected to the upper rail 11 through a seat cushion frame in a seat 23 mounted in the vehicle. Therefore, it is understood that a transverse load is applied to the upper rail 11 as a force, which is generated when the seat belt 25 is pulled in the event of a collision accident of the vehicle, is transmitted through the buckle 27 and the seat cushion frame.

In the present embodiment, the anti-rotation mechanism is configured by a plurality of catching protrusions 29 provided on the locking teeth 7 of the locking plate 9.

For reference, as another example, the anti-rotation mechanism may be implemented as a configuration in which a catching pin protruding downward from the upper rail 11 is inserted into a catching hole of the locking plate 9 when the locking state is implemented as the locking plate 9 moves upward.

In the present embodiment, the locking plate 9 includes a central portion 31 connected to the upper rail 11, and the plurality of locking teeth 7 protruding from two opposite sides of the central portion 31. The catching protrusions 29 are respectively provided at ends of the locking teeth 7.

The central portion 31 of the locking plate 9 is elongated in a longitudinal direction of the lower rail 5. The plurality of locking teeth 7 protrudes in a direction perpendicular to the longitudinal direction of the lower rail 5 and is disposed in the longitudinal direction of the central portion 31 at predetermined intervals. The catching protrusion 29 is shaped to protrude locally from the end of each of the locking teeth 7 in the longitudinal direction of the lower rail 5.

Figure 8:
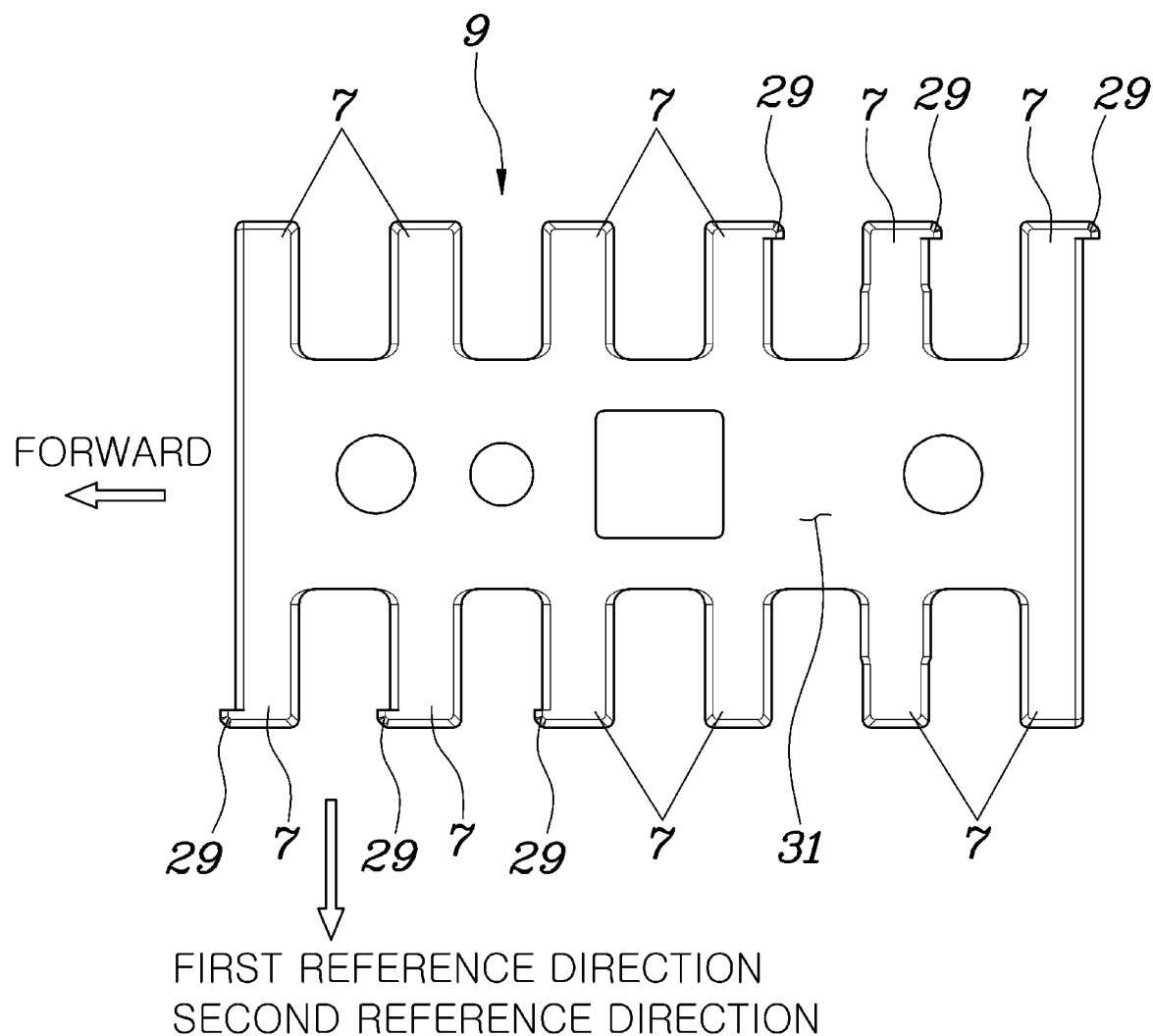
FIG. 8 is a top plan view illustrating a locking plate in FIG. 7.

In addition, as illustrated in FIG. 8, based on the central portion 31 of the locking plate 9, the catching protrusions 29 at one side protrude forward from the locking teeth 7, and the catching protrusions 29 at the other side protrude rearward from the locking teeth 7.

Figure 10:
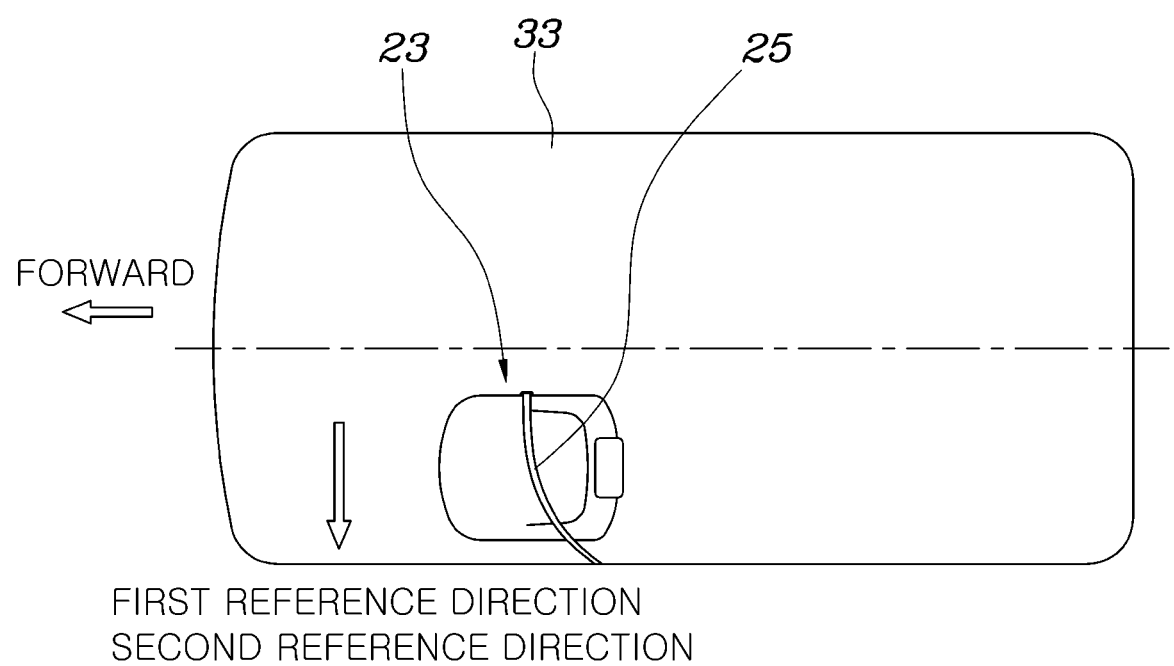
FIG. 10 is a view for explaining the seat disposed on a vehicle body, the seat belt, and directionality.

Meanwhile, as illustrated in FIG. 10, when a direction of the seat 23 installed to be close to one side based on a centerline of a vehicle body 33 is defined as a first reference direction, the catching protrusions 29 protrude forward from the locking teeth 7, which protrude in the first reference direction, based on the central portion 31 of the locking plate 9, and the catching protrusions 29 protrude rearward from the locking teeth 7, which protrude in a direction opposite to the first reference direction, based on the central portion 31 of the locking plate 9.

In addition, among the plurality of locking teeth 7 protruding in the first reference direction of the locking plate 9, only the locking teeth 7 at the front side have the catching protrusions 29, but the locking teeth 7 at the rear side do not have the catching protrusions 29.

In addition, among the plurality of locking teeth 7 protruding in the direction opposite to the first reference direction of the locking plate 9, only the locking teeth 7 at the rear side have the catching protrusions 29, but the locking teeth 7 at the front side do not have the catching protrusions 29.

Therefore, unlike the seat 23 in FIG. 10, the locking plate 9, which is installed on the seat rail 6 used to support the seat 23 installed at the right side based on the centerline of the vehicle body 33 in FIG. 10, is installed inversely so that the postures of the locking teeth 7 are changed vertically based on the central portion 31 of the locking plate 9 in FIG. 8.

Figure 11:
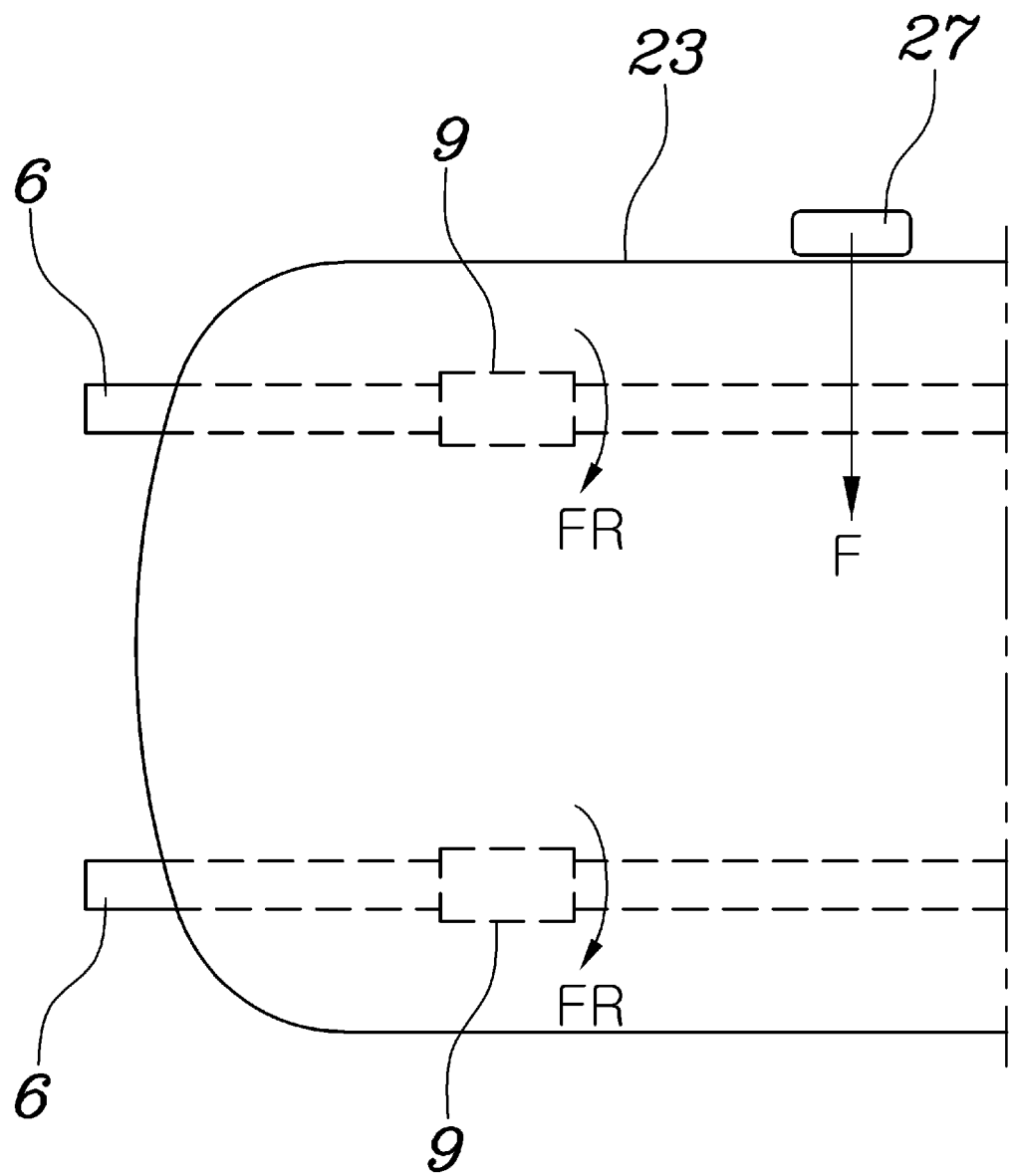
FIG. 11 is a view for explaining an operation of the present invention when the seat in FIG. 10 is viewed from above.

In this case, an operation of the locking plate 9, which is in a state illustrated in FIG. 8 and installed on the seat 23 in FIG. 10, will be described with reference to FIG. 11. When a transverse component F of a load, which is applied to the seat belt 25 by various types of accidents of the vehicle, is transmitted to the upper rail 11 and the locking plate 9 through the cushion frame of the seat 23, the locking plate 9 receives a clockwise rotational force FR, as illustrated in FIG. 11. In this case, the catching protrusions 29 formed on the locking teeth 7 are caught by the locking grooves 3 of the upper rail 11 and suppress the rotation of the locking plate 9.

Therefore, the locking state in which the locking plate 9 is inserted into the locking grooves 3 of the upper rail 11 may be more stably maintained.

That is, in the present invention, the catching protrusions 29 provided on the locking teeth 7 are appropriately formed only at positions and in directions that are required to restrict the rotation of the locking plate 9 in accordance with the position at which the locking plate 9 is mounted in the vehicle. Therefore, it is possible to ensure the stable seat locking state by restricting the rotation of the locking plate 9 and prevent an increase in manufacturing costs caused when unnecessary catching protrusions 29 are formed.

Meanwhile, the installation positions and directions of the catching protrusions 29 of the locking plate 9 may also be expressed as follows.

That is, when a transverse direction of the vehicle body 33 connected to a safety belt installed to connect the vehicle body 33 and the seat 23 is defined as a second reference direction, the catching protrusions 29 protrude forward from the locking teeth 7, which protrude in the second reference direction, based on the central portion 31 of the locking plate 9, and the catching protrusions 29 protrude rearward from the locking teeth 7, which protrude in a direction opposite to the second reference direction, based on the central portion 31 of the locking plate 9.

In addition, among the plurality of locking teeth 7 protruding in the second reference direction of the locking plate 9, only the locking teeth 7 at the front side have the catching protrusions 29, and the locking teeth 7 at the rear side do not have the catching protrusions 29. Among the plurality of locking teeth 7 protruding in the direction opposite to the second reference direction of the locking plate 9, only the locking teeth 7 at the rear side have the catching protrusions 29, and the locking teeth 7 at the front side do not have the catching protrusions 29.

That is, in the situation in FIG. 10, the seat 23 is installed at the left side based on the centerline of the vehicle body 33, and the seat belt 25 of the seat 23 is connected to a left sidewall of the vehicle body 33. Therefore, the first reference direction and the second reference direction mean substantially the same direction, and the positions and directions of the catching protrusions 29 of the locking plate 9 are also configured in the same way as those in FIG. 8.

The present invention may also be expressed as follows.

That is, the seat rail locking device for a vehicle of the present invention includes the lower rail 5 having the plurality of locking grooves 3, the upper rail 11 inserted into the lower rail 5 so as to be slidable straight, the locking plate 9 installed to be inserted into or withdrawn from the locking grooves 3 of the lower rail 5 by moving upward or downward relative to the upper rail 11, the springs 17 configured to elastically support the locking plate 9 upward and allow the locking teeth 7 of the locking plate 9 to be inserted into the locking grooves 3 of the lower rail 5, and the center pin 19 provided to implement a state in which the locking teeth 7 are withdrawn from the locking grooves by moving the locking plate 9 downward while overcoming the elastic forces of the springs 17 by means of a straight displacement provided from the outside. The catching protrusions 29 are provided on the locking teeth 7 of the locking plate 9 and prevent the rotation and withdrawal of the locking plate 9 relative to the lower rail 5.

The locking plate 9 has the central portion 31 disposed at a center thereof and elongated in the longitudinal direction of the upper rail 11. The plurality of locking teeth 7 protrudes from the two opposite sides of the central portion 31 so as to be correspondingly inserted into the locking grooves 3 of the lower rail 5.

In addition, the locking plate 9 has the catching protrusions 29 protruding forward from the plurality of locking teeth 7 positioned at the front side of one side based on the central portion 31, and the catching protrusions 29 protruding rearward from the plurality of locking teeth 7 positioned at the rear side of the other side based on the central portion 31.

The catching protrusions 29 protrude from the ends of the locking teeth 7 in the longitudinal direction of the central portion 31.

While the specific embodiments of the present invention have been illustrated and described, it will be obvious to those skilled in the art that the present invention may be variously modified and changed without departing from the technical spirit of the present invention defined in the appended claims.

What is claimed is:

1. A seat rail locking device for a vehicle, the seat rail locking device comprising:
    a lower rail having a plurality of locking grooves defined in an inner flange and opened downward;
    a locking plate having a plurality of locking teeth configured to be inserted into or withdrawn from the plurality of locking grooves when the locking plate moves upward or downward;
    an upper rail configured to be inserted into the lower rail to be slidably disposed thereon and having a locking-lifting mechanism configured to switch a locking state by moving the locking plate upward or downward; and
    an anti-rotation mechanism configured to suppress a rotation of the locking plate against a transverse load applied to the upper rail,
    wherein the anti-rotation mechanism comprises a plurality of catching protrusions disposed on at least one of the plurality of locking teeth of the locking plate.

2. The seat rail locking device of claim 1,
    wherein the locking plate comprises:
    a central portion connected to the upper rail; and
    the plurality of locking teeth protruding from two opposite sides of the central portion, and
    wherein the plurality of catching protrusions are disposed at ends of the at least one of the plurality of locking teeth.

3. The seat rail locking device of claim 2,
wherein the central portion of the locking plate extends in a longitudinal direction of the lower rail,
wherein the plurality of locking teeth is spaced apart from one another in a longitudinal direction of the central portion and protrudes in a direction perpendicular to the longitudinal direction of the lower rail, and
wherein each of the plurality of catching protrusions has a partial point protruding from an end of each of the plurality of locking teeth in the longitudinal direction of the lower rail.

4. The seat rail locking device of claim 3,
wherein the plurality of catching protrusions comprise:
a first set of catching protrusions arranged at one side of the central portion of the locking plate and protruding forward from the plurality of locking teeth; and
a second set of catching protrusions arranged at another side of the central portion of the locking plate and protruding rearward from the plurality of locking teeth.

5. The seat rail locking device of claim 4,
wherein when a direction of a seat installed to be close to one side of a centerline of a vehicle body is defined as a first reference direction, the first set of catching protrusions protrude forward from the locking teeth, which protrude in the first reference direction from the central portion of the locking plate, and the second set of catching protrusions protrude rearward from the locking teeth, which protrude in a direction opposite to the first reference direction from the central portion of the locking plate.

6. The seat rail locking device of claim 5,
wherein among the locking teeth protruding in the first reference direction of the locking plate, only the locking teeth at a front side have the catching protrusions, and the locking teeth at a rear side do not have the catching protrusions, and
wherein among the locking teeth protruding in the direction opposite to the first reference direction of the locking plate, only the locking teeth at the rear side have the catching protrusions, and the locking teeth at the front side do not have the catching protrusions.

7. The seat rail locking device of claim 4,
wherein when a transverse direction of a vehicle body connected to a safety belt installed to connect the vehicle body and a seat is defined as a second reference direction, the first set of catching protrusions protrude forward from the locking teeth, which protrude in the second reference direction from the central portion of the locking plate, and the second set of catching protrusions protrude rearward from the locking teeth, which protrude in a direction opposite to the second reference direction from the central portion of the locking plate.

8. The seat rail locking device of claim 7,
wherein among the locking teeth protruding in the second reference direction of the locking plate, only the locking teeth at a front side have the catching protrusions, and the locking teeth at a rear side do not have the catching protrusions, and
wherein among the locking teeth protruding in the direction opposite to the second reference direction of the locking plate, only the locking teeth at the rear side have the catching protrusions, and the locking teeth at the front side do not have the catching protrusions.

9. The seat rail locking device of claim 1,
wherein the locking-lifting mechanism comprises:
a guide bracket fixed to the upper rail and having a guide pin configured to guide upward and downward movements of the locking plate;
a spring configured to elastically support the locking plate upward with respect to the guide bracket and allow the locking plate to be coupled to the locking grooves of the lower rail; and
a center pin configured to allow the locking plate to be withdrawn from the locking grooves by moving downward while overcoming an elastic force of the spring by means of a straight displacement provided from an outside.

10. A seat rail locking device for a vehicle, the seat rail locking device comprising:
a lower rail having a plurality of locking grooves;
an upper rail configured to be inserted into the lower rail to be slidably disposed thereon;
a locking plate configured to be inserted into or withdrawn from the plurality of locking grooves of the lower rail by moving upward or downward relative to the upper rail;
a spring configured to elastically support the locking plate upward and allow a plurality of locking teeth of the locking plate to be inserted into the plurality of locking grooves of the lower rail; and
a center pin configured to implement a state in which the plurality of locking teeth are withdrawn from the plurality of locking grooves by moving the locking plate downward while overcoming an elastic force of the spring by means of a straight displacement provided from an outside,
wherein a plurality of catching protrusions are disposed on at least one of the plurality of locking teeth of the locking plate to prevent a rotation and withdrawal of the locking plate relative to the lower rail,
wherein the locking plate comprises a central portion disposed at a center thereof and extending in a longitudinal direction of the upper rail, and the plurality of locking teeth protrude from two opposite sides of the central portion to be correspondingly inserted into the plurality of locking grooves of the lower rail, and
wherein in the locking plate, a first set of the catching protrusions protrude forward from the locking teeth, which are positioned at a front side of one side of the central portion, and a second set of the catching protrusions protrude rearward from the locking teeth, which are positioned at a rear side of another side of the central portion.

11. The seat rail locking device of claim 10,
wherein the plurality of catching protrusions protrude from ends of the locking teeth in a longitudinal direction of the central portion.

12. A seat rail locking device for a vehicle, the seat rail locking device comprising:
a central portion having a flat plate shape and extending straight;
a plurality of locking teeth protruding from two opposite sides of the central portion in a direction perpendicular to a longitudinal direction of the central portion and disposed at predetermined intervals; and
catching protrusions protruding from ends of at least one of the plurality of locking teeth in the longitudinal direction of the central portion.

13. The seat rail locking device of claim 12,
wherein a first set of the catching protrusions protrude forward from the locking teeth, which are positioned at a front side of one side of the central portion, and a second set of the catching protrusions protrude rearward from the locking teeth, which are positioned at a rear side of another side of the central portion.

* * * * *